(12) United States Patent
Takaoka

(10) Patent No.: US 6,693,718 B1
(45) Date of Patent: Feb. 17, 2004

(54) IMAGE PROCESSING APPARATUS AND METHOD FOR PROCESSING A COLOR IMAGE, AND STORAGE MEDIUM STORING PROGRAM CODE OF THE METHOD

(75) Inventor: Makoto Takaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,025

(22) Filed: May 28, 1999

(30) Foreign Application Priority Data

May 29, 1998 (JP) .......................................... 10-150006

(51) Int. Cl.⁷ .............................................. G06K 15/00
(52) U.S. Cl. ........................ 358/1.15; 358/1.9; 382/162; 382/167
(58) Field of Search ........................... 358/1.1, 1.2, 1.3, 358/1.4, 1.5, 1.6, 1.7, 1.8, 1.9, 2.1, 1.11, 1.12, 1.13, 1.14, 1.15, 1.16, 1.17, 1.18, 3.28; 382/162, 167

(56) References Cited

U.S. PATENT DOCUMENTS

| | | | |
|---|---|---|---|
| 5,349,452 A | 9/1994 | Maeda et al. | 358/527 |
| 5,483,358 A | 1/1996 | Sugiura et al. | 358/508 |
| 5,561,536 A | 10/1996 | Sugiura et al. | 358/500 |
| 5,703,967 A | 12/1997 | Takaoka | 382/239 |
| 5,761,394 A | 6/1998 | Sugiura et al. | 395/109 |
| 5,806,081 A * | 9/1998 | Swen et al. | 707/528 |
| 5,872,895 A * | 2/1999 | Zandee et al. | 358/1.9 |
| 5,917,939 A * | 6/1999 | Ohta et al. | 358/506 |
| 6,175,663 B1 * | 1/2001 | Huang | 382/284 |
| 6,430,311 B1 * | 8/2002 | Kumada | 382/162 |

FOREIGN PATENT DOCUMENTS

| | | |
|---|---|---|
| EP | 0 565 283 A1 | 10/1993 |
| EP | 0 767 445 A2 | 4/1997 |
| WO | WO 91/10316 | 7/1991 |
| WO | WO 94/30003 | 12/1994 |
| WO | WO 96/01467 | 1/1996 |

OTHER PUBLICATIONS

Patent Abstracts of Japan, vol. 018, No. 675, Dec. 20, 1994, JP 06 268786 A.

Kanamori, Fast color processor with programmable interpolation by small memory (PRISM), Journal of Electronic Imaging, Jul. 1993, USA. vol. 2, No. 3, pp. 213–224.

Johnson, Methods of characterizing colour printers, Displays, GB, Barking, vol. 16, No. 4, May 1, 1996. Pp. 193–202.

* cited by examiner

Primary Examiner—Gabriel Garcia
Assistant Examiner—King Y. Poon
(74) Attorney, Agent, or Firm—Fitzpatrick, Cella, Harper & Scinto

(57) ABSTRACT

An image processing apparatus which obtains an output result faithful to an original image independently of characteristics of a device to optically read the original image. When the original image is read by an image scanner, layout and the like of the read image are analyzed, recognition is performed on characters, and compression is performed on an image area. The image data is stored with Profile (color characteristic information) unique to the image scanner. When the image is displayed or print-outputted, color matching is performed in accordance with Profile of a display device or printer and the Profile of the image scanner, and the image is reproduced.

8 Claims, 9 Drawing Sheets

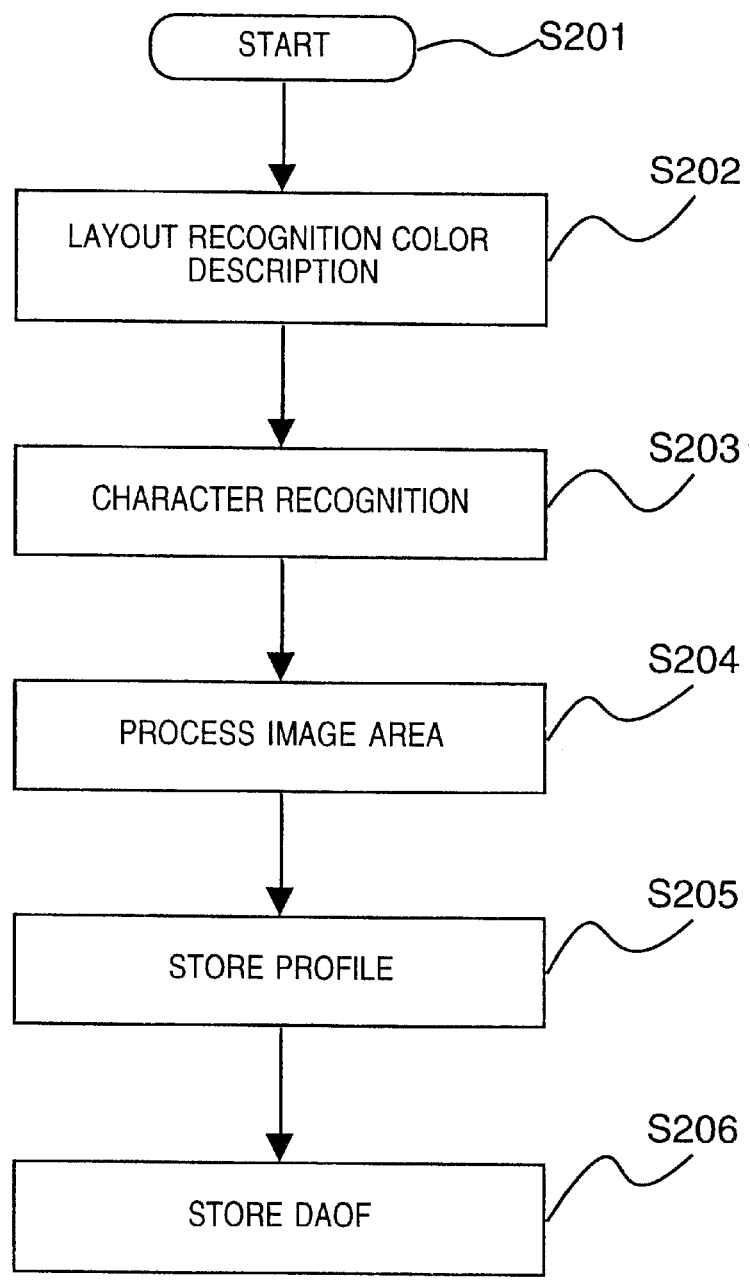

FIG. 9

| IP | DEVICE | PROFILE NAME |
|---|---|---|
| 192.168.1.100 | SCANNER (300dpi : COLOR) | SCANNER 01. pro |
| 192.168.1.105 | SCANNER (600dpi : MONOCHROME) | SCANNER 02. pro |
| 192.168.1.120 | PRINTER (600dpi : COLOR) | PRINTER 01. pro |
| ⋮ | ⋮ | ⋮ |
| | | |

IMAGE PROCESSING APPARATUS AND METHOD FOR PROCESSING A COLOR IMAGE, AND STORAGE MEDIUM STORING PROGRAM CODE OF THE METHOD

BACKGROUND OF THE INVENTION

The present invention relates to image processing apparatus and method and a storage medium, and more particularly, to image processing apparatus and method and storage medium for optically reading an original image and producing a color output.

Conventionally, when a original document is edited and reused, the image is read by a scanner, and character recognition is performed on the read image. Further, in recent years, as many documents have a complicated layout, layout analysis processing is performed prior to character recognition, and the precision of layout analysis processing has been increasingly valued.

If layout recognition and character recognition have been performed on a document original and the document is stored in the format of processed result, it is convenient to use the data in a search system.

The storage format in this case usually is a file format of a particular application program. For example, the format is RTF (Rich Text Format) by Microsoft Corporation, Ichitaro (trademark of Justsystem Corporation) format, or recently, HTML (Hyper-Text Markup Language) format often used on the Internet.

However, if documents are in different formats of particular application programs, compatibility between the formats may not be realized. Further, if document data is read by using another application program, the layout of the document may become different from the original document, thus, the conversion precision may be lowered.

Then, there has been a need for an intermediate format to hold information obtained from the results of layout analysis and character recognition processing, for as many types as possible, and maintain precision in conversion to various application programs.

Against this background, proposed are formats to realize compatibility among various application software or systems by conversion processing. These formats are SGML (Standard Generalized Markup Language) format and PDF (Portable Document Format), for example. Such intermediate formats are needed and utilized. Here these formats will be called a DAOF (Document Analysis Output Format) as a temporary format name, for convenience of explanation.

Upon filing or exchanging document images, image data are stored as bitmap data, or compressed and stored or exchanged. However, in a case where a data format remains the same, a problem occurs when the image data is used later unless the data represents a natural image. For example, if an image including text is stored, search using a character string in the text cannot be made. Further, the text cannot be re-edited by word-processor software or the like on a computer.

Accordingly, there is a need for a format to hold a document image in compressed state, and further, hold the results of image analysis, as character code, layout description, description of imaging figure, picture and the like, further, to send the result of analysis of table structure to spreadsheet software or the like.

As a solution, the DAOF format, thought by the present inventor, is used for analysis of document image, and provides a data structure comprising, as results of document image analysis, data storage areas of layout descriptor, character recognition descriptor, table structure descriptor and image descriptor. The layout descriptor contains attribute information of respective areas in the document, TEXT, TITLE, CAPTION, LINEART, PICTURE, FRAME, TABLE and the like, and rectangular area address information corresponding to the areas. The character recognition descriptor contains the results of character recognition on the character areas, TEXT, TITLE, CAPTION and the like. The table descriptor contains the details of table structure of a table portion determined as TABLE. The image descriptor contains image data, determined in the layout descriptor as PICTURE, LINEART and the like, cut out from the original image. FIG. 3A shows the structure.

The structure of these described results of analysis is stored, not only as an intermediate data but also as one file.

The results of image document analysis are stored in this manner. Then further, there is an increasing need to store color information in addition to character information and layout information in the document image.

The above-described DAOF structure is made with emphasis on faithfully reproducing the results of layout recognition and character recognition. However, this structure does not enable faithful reproduction of colors of original image in monitor displaying or printing the file information. The faithful color reproduction cannot be performed without color matching to match the characteristics of an input device and those of an output device.

SUMMARY OF THE INVENTION

The present invention has been made in consideration of the above situation, and has its object to provide image processing apparatus and method and storage medium which enable a color management system (CMS) to obtain an output result faithful to an original image regardless of characteristics of means for optically reading the original image.

According to the present invention, the foregoing object is attained by providing an image processing apparatus which optically reads a color original image by input means, and converts the read original image into color document data with a predetermined structure, comprising storage means for storing unique information indicative of input characteristics of the input means, used when reading the color original image, as a part of definition of the color document data.

Another object of the present invention is, when a document read by a scanner or the like from a paper document and document-analyzed is utilized on a computer, to reproduce colors of a color image, especially colors of a natural image in the document, closely to colors of the original paper document.

Further, another object of the present invention is to enable color reproduction based on color information of a character area of the above image as much as possible, and to reproduce a base color of the document as much as possible.

In accordance with preferred embodiments of the present invention, the foregoing objects are attained by providing document image analysis data structure as follows.
(1) DAOF Header
(2) Scanner Profile
(3) Layout descriptor
(4) Character recognition descriptor
(5) Table analysis descriptor (6) Image descriptor
(7) Color descriptor In the embodiments, as the item to store the "Scanner Profile" is extended, the color reproduction in the image descriptor (6) is possible.

Further, the extension is effective in the color reproduction in the character recognition descriptor (4), and in the reproduction of base color of a document image represented in the color descriptor (7).

As a procedure to generate the above-described DAOF, (1) Color characteristics of a color image input device are obtained in the form of Scanner Profile. As the color characteristics differ in accordance with scanner type, scanner information of the color image input device is also stored.

(2) Next, document analysis is performed on a color document image, to extract the above-described TEXT area, a table area, an image area and the like (layout descriptor). In the TEXT area, character recognition is performed (character recognition descriptor). In the table area, table analysis processing is performed (table analysis descriptor). In the image area (including line image), a bitmap image is cut out and stored as data without conversion as in character code (in case of figure portion such as a line image, vectors are obtained in accordance with necessity).

(3) In the color descriptor, color information of the areas extracted upon layout processing (2) are described. For example, a base color, the color in an area and the like are described.

To display on a computer or color print-output an electronic document described in the above format, a code descriptor must be converted to that appropriate to the output device. For example, to use the document on MS Word (trademark of Microsoft Corporation), the code descriptor must be converted to that in the RTF (Rich Text Format) format. To color print-output the document, the code descriptor must be converted to, e.g., that in PostScript (trademark of Adobe Systems Incorporated) format. However, in the image area, the position information must be converted to that in an appropriate format, but the bitmap data itself is merely transferred. Upon this transfer, to realize the CMS in the original image, the Scanner Profile, and Monitor Profile or Printer Profile unique to the output device are utilized to perform image data conversion. Then the image data is transferred.

Further, the color information of the respective areas described in the color descriptor is similarly converted, and after the CMS has been realized, converted into the respective description formats.

As described above, the present invention enables faithful color reproduction in addition to faithful document reproduction upon recognition and processing a document image for reuse.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a schematic flowchart showing processing according to the first embodiment;

FIG. 9 is an example of a profile table according to a second embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
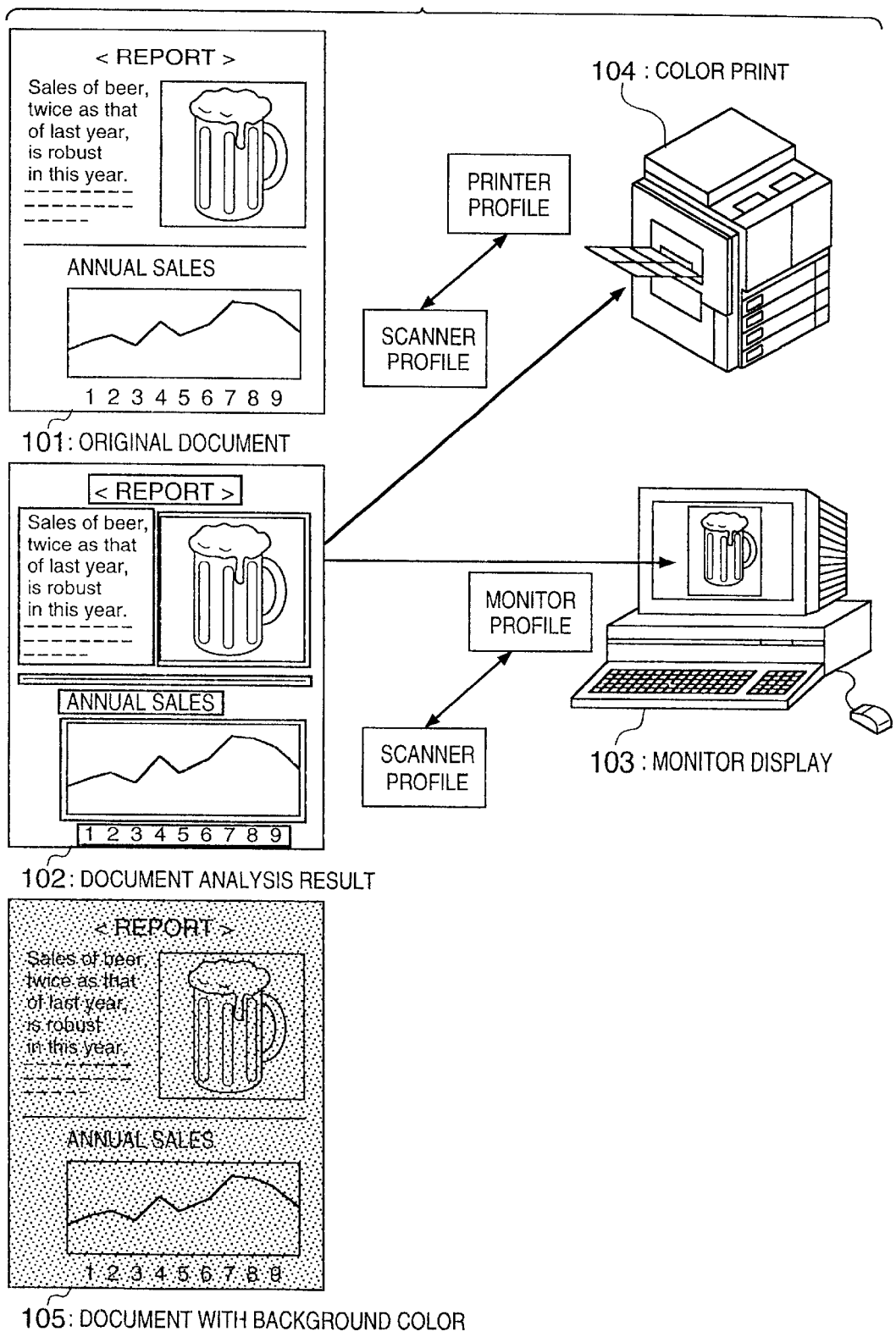
FIG. 1 is an explanatory view showing the relation between original images and the results of document analysis according to a first embodiment of the present invention.

FIG. 1 shows an example of progress of color document processing characteristic of the present invention. When an original document 101 is read by a scanner or the like, and layout analysis and character recognition are performed on the read data, document analysis result 102 is generated. In the document analysis result 102, frames are shown as the results of layout analysis, and images in the frames are analysis results respectively having significance. For example, in a frame where a character string "<report>" is described, character recognition processing is performed. A picture of "beer" is treated as an image, and a bitmap image is cut out. To reduce the amount of information, the image may be compressed. Further, processing appropriate to the respective areas such as line, table and line image are performed.

In monitor display 103, color matching characteristic of the present invention is displayed. In the cut out image area, one pixel comprises 24 bit data where 8 bits are allotted to each of RGB colors. If the data is displayed without any processing as shown on the monitor display 103, an image based on the characteristics of the scanner device is displayed. For example, a purplish red based on the scanner characteristic is represented as red based on the monitor characteristic. Thus a color difference occurs. This problem is solved by providing a Profile for CMS in the document analysis result. That is, the document analysis result includes Scanner Profile and scanner information (model name or the like). Upon monitor display, matching is performed between the Scanner Profile and the Monitor Profile. The image area such as a photographic image in the document analysis result is data-converted based on the Profiles, and displayed. In the monitor display 103, color reproducibility of a display image can be ensured. Similarly, in color print 104, a Printer Profile is compared with the Scanner Printer, data is converted, and print-outputted. Thus, color reproducibility upon printing can be ensured.

Note that when the image data is outputted to a color printer or monitor, if the image scanner used for reading the image is connected to the device, as matching is not necessary, display or printing can be made without any problem. If an information processing apparatus connected to a printer is provided separately from an information processing apparatus connected to an image scanner, image read by the image scanner may be stored, with the Scanner Profile, into a storage medium such as a floppy disk. If these apparatuses are connected to a network, image information with the Scanner Profile can be transmitted/received via the network.

Further, if a document with background color 105 is handled, the color information is held in the color descriptor. In this example, the background has a single color and processing is simple. In the color descriptor, colors can be designated for respective areas, based on the results of layout analysis.

In this case, as color data holds the characteristics of a scanner upon reading, when the image is displayed on a monitor or printed, color reproducibility can be ensured by color matching correction similar to the matching as described above.

Figure 8:
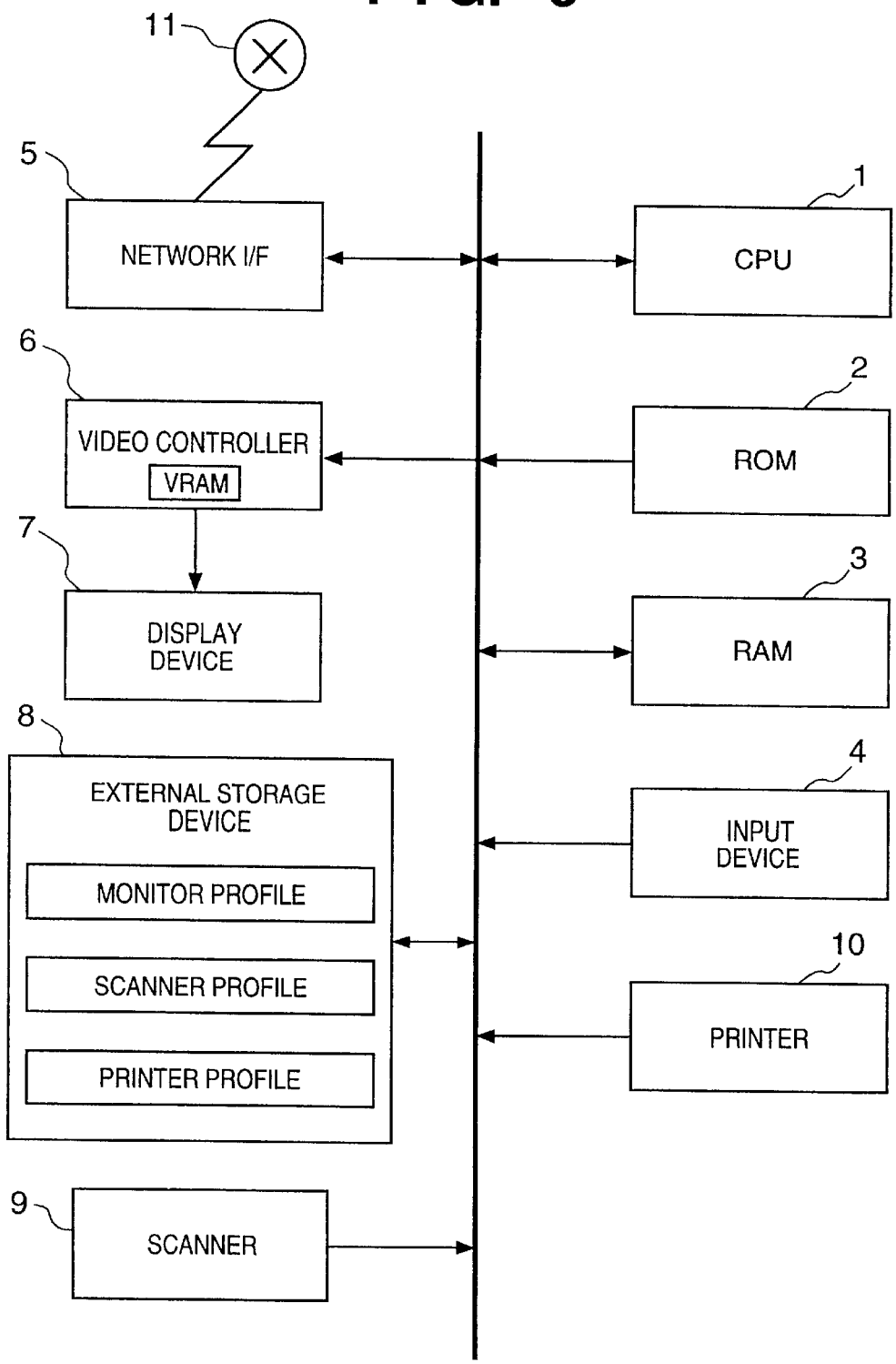
FIG. 8 is a block diagram showing the construction of an image processing apparatus of the first embodiment.

FIG. 8 is a block diagram showing the construction of an image processing apparatus of the first embodiment.

In FIG. 8, reference numeral 1 denotes a CPU which controls the overall apparatus; 2, a ROM for storing a BIOS, a boot program and the like; 3, a RAM for loading an OS and various application programs; 4, an input device comprising a keyboard and a pointing device such as a mouse; 5, a network interface unit for information transmission/reception between the apparatus and a network 11; 6, a video controller having a video memory; 7, a display device to display an image based on a video signal from the video controller 6; 8, an external storage device in which the OS (e.g., Windows by Microsoft Corporation) and the various application programs and data files are stored; 9, an image scanner which reads an original image as a color image; and 10, a color printer. Note that characteristic information of the display 7, the scanner 9 and the printer 10, Display Profile, Scanner Profile and Printer Profile, are stored in advance in the external storage device 8.

Next, the operation processing of the above construction will be described in accordance with the flowchart of FIG. 2. Note that a program of the flowchart is stored in the external storage device 8, and is loaded onto the RAM 3 and executed.

At step S201, processing starts, to pick up a document image from the scanner 9. At step S202, layout recognition (described later) is performed to analyze character area, figure and natural image area, table area, line and frame area. At the same time, analysis is performed on color information of a character base color such as base color or line marker, a character color and the like.

Next, at step S203, character recognition (described later) is performed. This processing is made with respect to an area determined as a character area in the layout recognition processing (step S202), for each character. The recognition results include several characters as the first candidate, the second candidate, . . . for each character.

In image processing (step S204), especially, a multivalued color image is cut out, and correspondence between the image and the above-described DAOF is obtained. The image data has, e.g., an RGB 24-bit color data structure. In this processing, the image data may be held without any processing, or the image data may be compressed and held. Further, a rectangular mask may be overlaid on the original image, without cutting the image out, and only the position of the image may be linked to the DAOF.

In Profile storage processing (step S205), when the image is inputted, the Scanner Profile is stored with correspondence with the read image. In this processing, the Profile previously adjusted, as shown in FIG. 8, is utilized. Similar processing is performed for the display monitor, printer and the like.

In a case where the document image data has not been inputted from the scanner 9 of the apparatus itself but obtained otherwise, e.g., only the image data is inputted via the network, the Profile of input device does not exist. In this case, (1) no Profile data may be stored; (2) the data may be stored with correspondence with a default Profile; or (3) the Monitor Profile upon use of the computer may be replaced with the Scanner Profile and the data may be stored.

In case of (1), as the original image has no Profile, upon monitor display, the image data itself is displayed. In this case, as the original image itself does not exist, there is no serious problem even if colors of the display image somewhat differ. However, when the image is outputted by the printer, colors of the printed image are considerably different from those of the displayed image since the color reproduction range of the scanner and that of the monitor are greatly different from that of the printer. Further, the scanner and the monitor produce an output in accordance with luminance data, while the printer produces an output in accordance with concentration data. Thus, the difference in color space is considerably great between the scanner or monitor and the printer.

Accordingly, it is desirable to store a default Profile (2). In this storage processing, the characteristics of a scanner are used as the default Profile, as often used, or the color reproduction range may be reduced to a minimum range that can be shared with other output devices. In case of processing (3), as the Scanner Profile and the Monitor Profile have many corresponding portions, they can be replaced with each other. In this case, the Profile of the currently-used monitor is inserted into the DAOF.

By the above methods, an image obtained from the other device than the scanner can be handled.

At step S206, the data is converted to data of intermediate format having the DAOF structure, and stored into the external storage device 8.

Figure 3A:
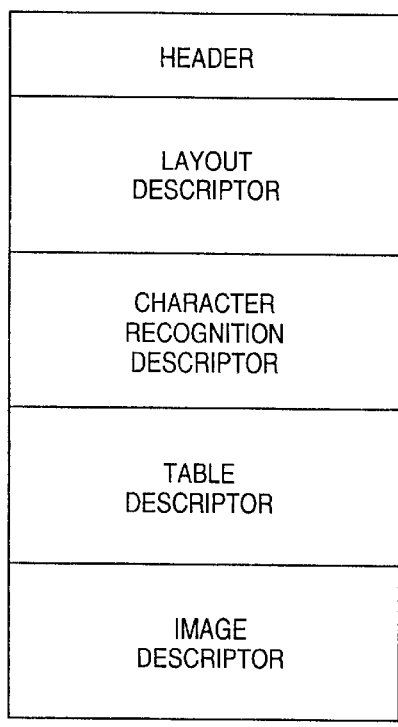
FIGS. 3A and 3B are tables showing the conventional data format and the data format of the first embodiment.
Figure 3B:
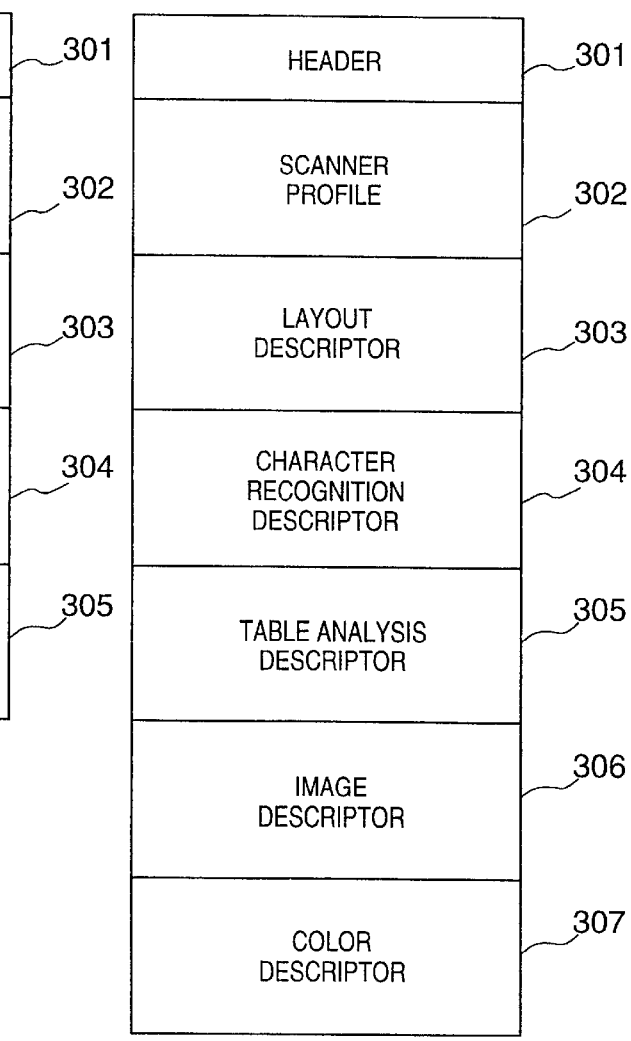

FIGS. 3A and 3B show the data structures for storing the results of the above-described processing. FIG. 3A shows the conventional data format for storing the results of analysis of a document image. FIG. 3B shows the data format having a Scanner Profile descriptor 302 according to the present embodiment.

Figure 4:
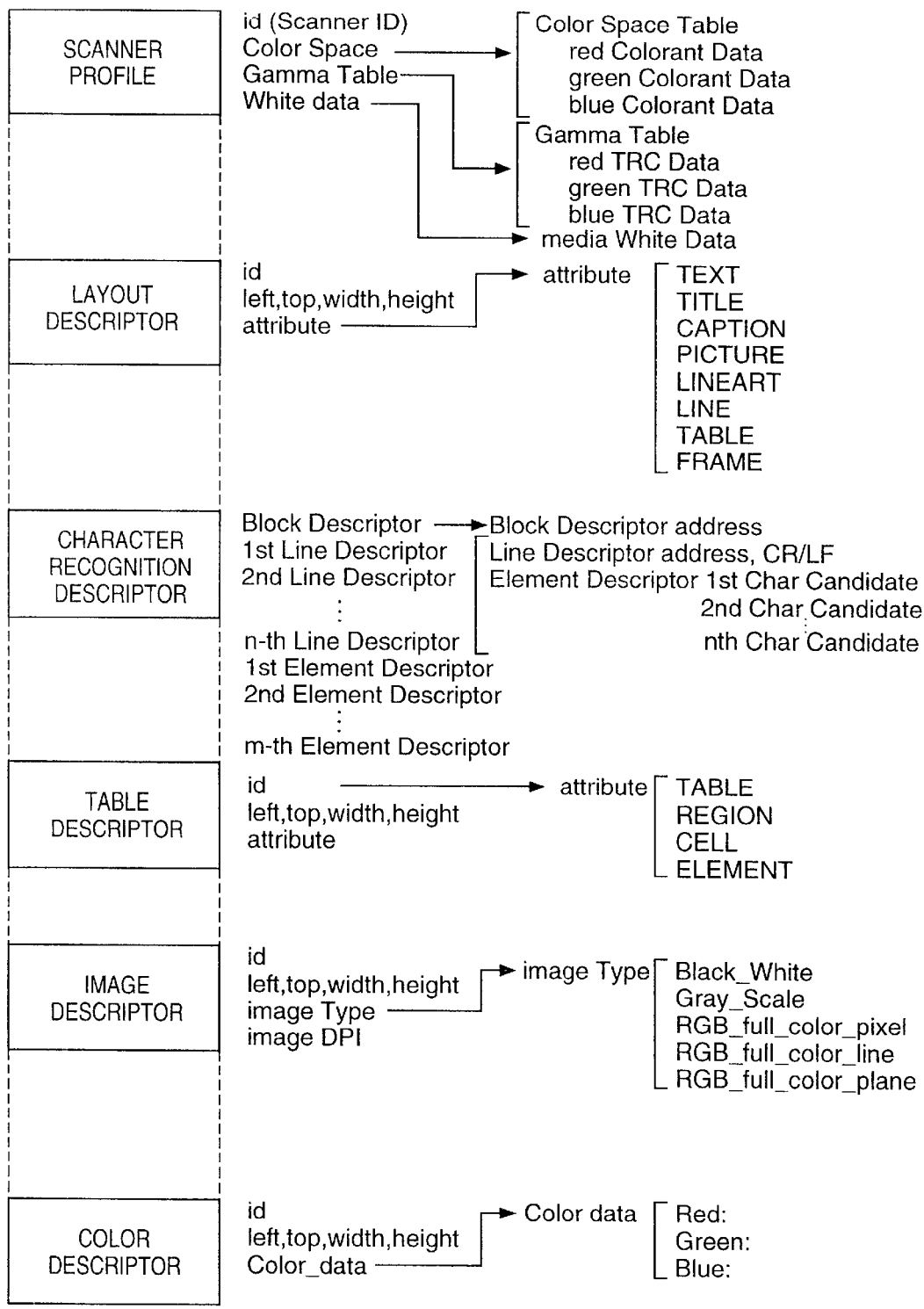
FIG. 4 is an explanatory view showing the data structure of the embodiment in detail.

FIG. 4 shows the data structure according to the embodiment in detail.

The Scanner Profile comprises (1) Color space data, (2) Gamma data and (3) White data. In the Color space data, parameters for conversion equation between device color space (R, G and B) and standard color space (X, Y and Z), i.e., "$\theta_{00}$" to "$\theta_{22}$" in the following equation are described;

$$\begin{pmatrix} X \\ Y \\ Z \end{pmatrix} = \begin{pmatrix} \theta_{00} & \theta_{01} & \theta_{02} \\ \theta_{10} & \theta_{11} & \theta_{12} \\ \theta_{20} & \theta_{21} & \theta_{22} \end{pmatrix} \begin{pmatrix} R' \\ G' \\ B' \end{pmatrix}$$

In the Gamma data, gamma curves of the respective R, G and B of the device are described.

In the White data, (R, G and B) values representing White color of the device are described.

In the layout descriptor, the rectangular area addresses of the analyzed respective blocks and their attributes are described. Explanations of other various information will be omitted.

In the character recognition descriptor, detailed information of a corresponding character area is described in a Block Descriptor. In a Line Descriptor, information on one line is described. The information in each Line Descriptor is generated from information on character delimiting in character recognition. In an Element Descriptor, the results of character recognition (character codes), as the first candidate to nth candidate, are described. In the present embodiment, about eight candidates are described.

In the table descriptor, as well as the rectangular area address information, attributes TABLE, REGION, CELL and ELEMENT are given. The attribute TABLE represents an area of the entire table. The attribute REGION represents an area of the maximum frame surrounded by lines. The attribute CELL represents a minimum unit frame having significance in the table. The attribute ELEMENT represents a frame of one-line unit character string area.

The image descriptor comprises rectangular area information, information image type information, indicating resolution information and the like.

In the color descriptor, color(s) within frame information in the layout descriptor is described. For example, if the document has a single base color, the color is described in a color designation in a Page at the lop level. Further, the color within the table or the like is described. Mainly, a background color is described.

Figure 5:
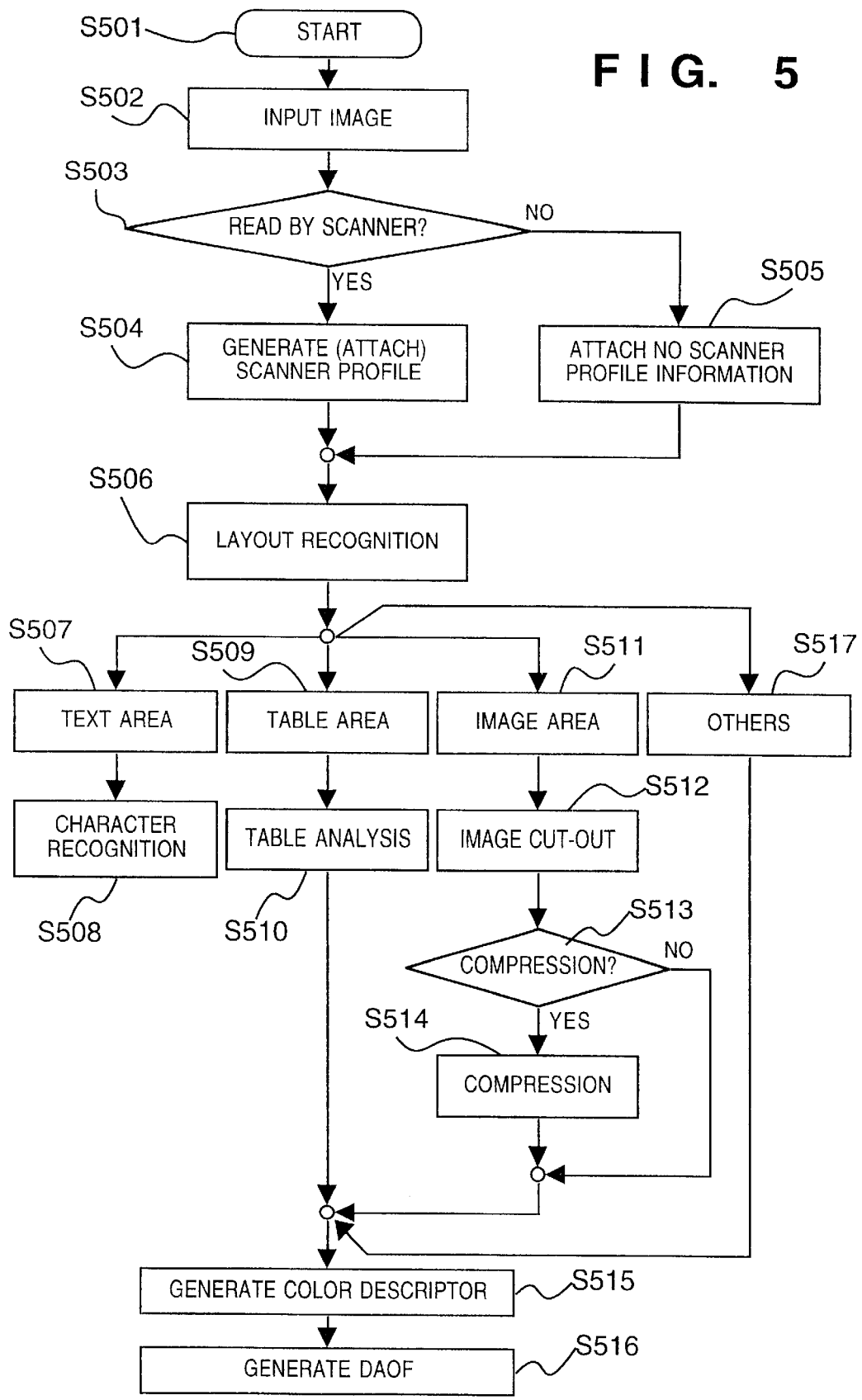
FIG. 5 is a flowchart showing a process procedure according to the first embodiment.

FIG. 5 shows a process procedure according to the present embodiment.

First, when the process starts, an original image is inputted at step S502. Then, it is determined at step S503 whether or not the input image is read by the scanner 9 connected to the system. If it is determined that the image has been read from the scanner 9, the Scanner Profile of the scanner 9 is read from the external storage device 8 at step S504, and data in correspondence with the DAOF format is generated. On the other hand, if it is determined that the image has been inputted from the network or another medium (e.g., a removable storage device such as a floppy disk), the Scanner Profile is not generated nor read (step S505).

Thereafter, layout recognition processing is performed on the input image (step S506), to recognize the category of each block as TEXT (character), TABLE (table), image, and others.

More specifically, black pixels of document image data are detected, and a rectangular frame of black pixel block is generated by outline tracing or labeling. Next, it is determined whether the frame is a character area (title, text, caption or the like), figure and natural image area, a table (TABLE) area or the like, based on the density of black pixels, existence/absence of adjacent rectangular block, length/width ratio and the like, to perform various processing's as follows.

If it is determined that the frame is a table area (step S509), character portions and line portions constructing the table can be separated by tracing continuous black pixels, by any of outline tracing and labeling. Regarding the lines constructing the table, the lengths and coordinates of the respective line segments are extracted. Regarding the characters in the table, an arbitrary character recognition program (which is also called in processing on the TEXT area) is called so as to perform character recognition (step S510).

Further, if it is determined that the frame is an image area (step S511), the image is cut out at step S512 (the coordinates and the size information are also stored). If compression is necessary, the image is compressed.

If it is determined that the frame is a TEXT area (step S507), character recognition is performed. The character recognition processing includes, e.g., feature vector extraction, comparison and the like. Assuming that a character "A" exists in the document image data, the character is cut out at the first stage. In this processing, a rectangle portion of the character, obtained by detecting the status of continuity of black pixels, is cut out. At the second stage, the character is cut out as m×n, e.g., in 64×64 blocks. Then, a 2×2 block window is used to extract directions of distribution of black pixels (direction vector information). The window is shifted,: and obtain several tens of direction vector information. The vector information are treated as the features of the character. The feature vectors are compared with a predetermined character recognition dictionary, to extract characters from the closest one, as the first candidate, then, a next closest one, as the second candidate, and then, a third closest one, as the third candidate. The approximation of feature vectors to a candidate character is represented as how short the distance between the vectors and the character is, i.e., a numerical value of similarity. A character having a higher similarity is a candidate with higher precision. Note that character recognition may be performed by any other method.

When the various areas have been processed as above, the process proceeds to step S515, at which the color descriptor is generated. This processing is made so as to match the colors in monitor display or printing to those of the original image.

The respective color reproduction ranges (color space) of the scanner (input device), the printer and the monitor are stored in advance. That is, parameters for converting the color space of a device to the standard color space are obtained and tabulated, and stored in the format of Profile unique to the device. For example, if there are the Scanner Profile and the Monitor Profile, matching can be made between the colors of the input image and those of monitor display image.

The Scanner Profile and the Monitor Profile, both based on luminance, have the same form. The Printer Profile, with a greatly different color reproduction range, has another format.

Thus, when the color descriptor has been generated, the process proceeds to step S516, at which the DAOF is generated, and the process ends.

As a result of the above processing, if the image read by the scanner 9 connected to the present apparatus is transferred to another terminal (e.g., a terminal X) on the network, as the image is accompanied with the Scanner Profile of the scanner 9, the image can be reproduced on a monitor of the terminal X, or print-outputted in colors matched to the original image.

Next, an application of the present embodiment will be described.

Figure 6:
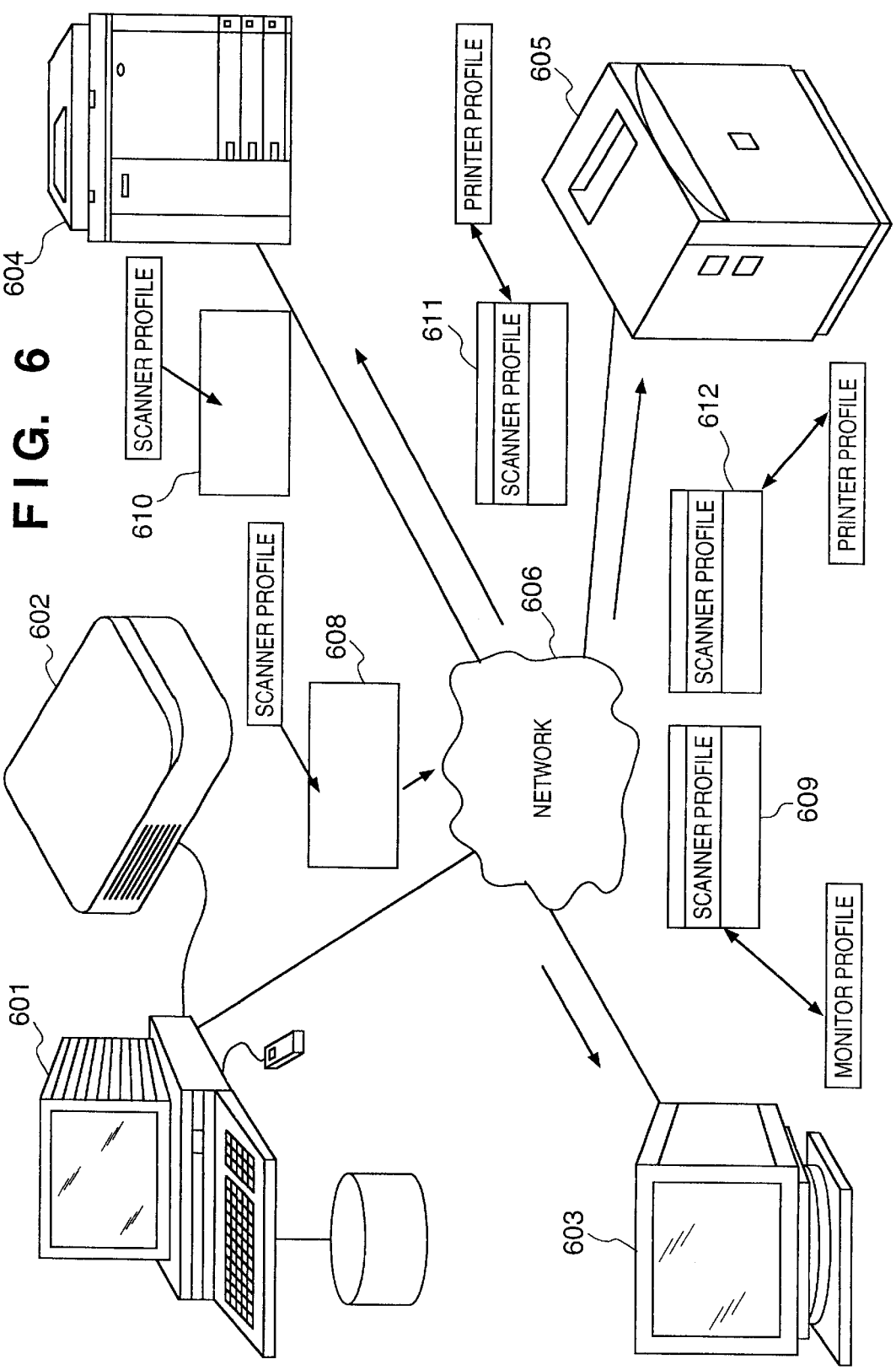
FIG. 6 is an explanatory view showing the system construction of the first embodiment.

FIG. 6 shows an example of a system to which the embodiment is applied. In the construction of FIG. 6, a computer 601 comprises the construction as shown in FIG. 8. A color image is inputted from a scanner 602 connected to the computer 601. The above-described document analysis processing is performed on the image data. Then generated analysis result data 608 is stored with the Profile of the scanner 602. In FIG. 6, the analysis result data is reused in another device on the network. A monitor 603 has its own Monitor Profile. Based on the Monitor Profile and the Scanner Profile, color matching can be made between a monitor image and the original image. Similarly, if a color printer 605 prints an image based on the input image data, color matching is performed based on the Printer Profile and the Scanner Profile, then printing is performed.

Even in a color copier 604 having a scanner and a printer, once document analysis is performed, similar processing is performed.

Note that the computer 601 has the Scanner Profile of the scanner 602 connected to the computer, and various output devices or computers connected to the output devices have Profiles of the output devices. Accordingly, color matching is performed in the output stage, and an output device, with any output device characteristics, can obtain an image in approximately the same colors as those of the original image.

Second Embodiment

In the above embodiment, the Profiles of the devices are locally held. However, the statuses of the devices connected to the computer may change, and the Profiles may change by control. Then, it may be arranged such that the Profiles of the various devices are managed by a server on the network, and the Profile of an output device, appropriate to scanner information (name, ID and the like specifying the scanner) described in the Scanner Profile in the DAOF, is downloaded from the server side and color matching is performed.

FIG. 9 shows contents of a profile table managed by the server. As shown in FIG. 9, information on each device constructs information specifying the device (network address in FIG. 9), the type and function of the device, and a profile file name.

Preferably, when a client terminal on the network inputs an image from a scanner on the network or outputs a read image onto the network, the image is accompanied with information unique to the input or output device (e.g., an ID), and corresponding Profile is obtained from the server with the unique information as a key.

As a result, as the file itself merely have information specifying the input device but does not have the above-described Profile, the amount of data can be reduced.

Third Embodiment

Figure 7:
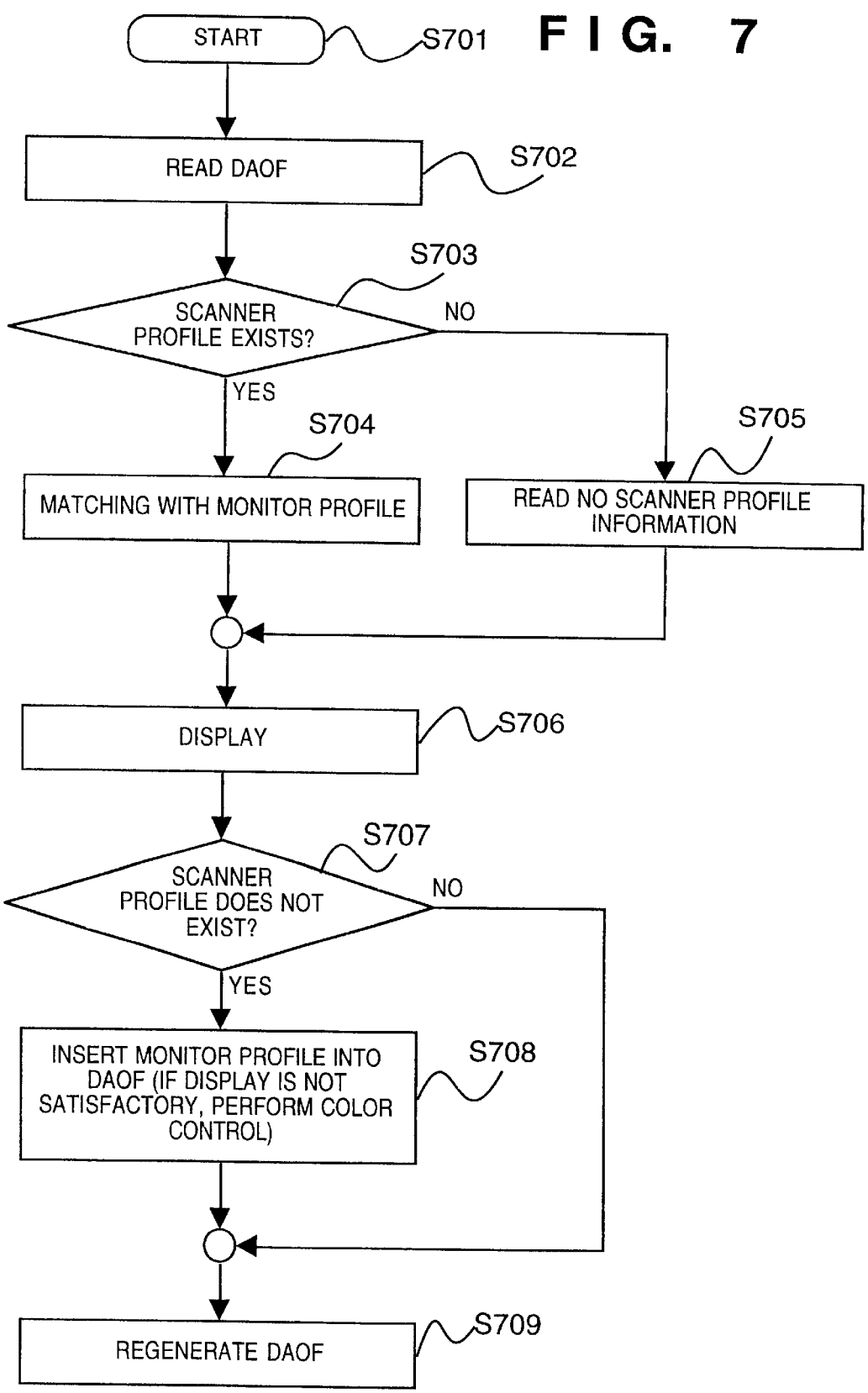
FIG. 7 is a flowchart showing an operation process procedure according to a third embodiment of the present invention.

FIG. 7 is a flowchart showing an operation process procedure according to a third embodiment of the present invention. In this case, there are a plurality of scanner as described above, and image data is obtained from unspecified one of the scanners. The processing is made by the processing system as shown in FIG. 5. The data is stored in status of no Scanner Profile. Next, when the stored DAOF is displayed on a monitor, the bitmap data is displayed without any processing.

FIG. 7 shows processing especially on the image area. At step S702, the DAOF is read, and at step S703, it is examined whether or not a Scanner Profile exists. If no Scanner Profile exists, processing for no Profile status is performed at step S705. This processing does not realize the CMS. If the Scanner Profile exists, color matching is performed at step. S704.

At step S706, monitor display is performed, and at step S707, it is determined whether or not scanner profile exists. If it is determined at step S708 that the image is sufficiently displayed on the monitor, the Monitor Profile is inserted into the DAOF. At this time, if the display is not satisfactory, color control is performed. At step S709, the DAOF is stored again.

In this example, the Monitor Profile is inserted into the DAOF because the Scanner Profile and the Monitor Profile can be handled as data strictures similar to each other, as described above. By the above processing, color reproduction in the output result by the color printer 605 and that by the monitor display 603 are the same.

Note that in the embodiments, layout analysis is performed on a color original image read by an image scanner, and various processing are performed for the respective image types. However, only to faithfully reproduce an original image and display the reproduced image, only the read image information and the Profile of the image scanner as the input device are necessary. That is, at the stage of display or output by an output device such as a printer, required is only color matching between the Profile of the image scanner and the Profile of the output device.

The present invention can be applied to a system constituted by a plurality of devices or to an apparatus comprising a single device.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As described above, according to the embodiments, by describing Profile information for color matching in a document analysis descriptor, following advantages are obtained.

(1) Upon monitor display and print output, the colors of a color image area can be matched to those in an original image.

(2) Similarly, a base color and colors of color-displayed image match to those of an original document.

As described above, according to the present invention, an output result faithful to an original image can be obtained independently of characteristics of means for optically reading the original image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting a color original image by an image scanner device or from a network;

conversion means for converting the inputted original image into color document data with a predetermined structure;

determination means for determining whether the inputted original image was inputted by the image scanner device or from the network; and storage means for, when said determination means determines that the inputted original image was inputted by the image scanner device, storing unique information indicative of input characteristics of said input means, used when reading the color original image, as a part of a definition of the color document data, wherein said storage means does not store the unique information indicative of input characteristics of said input means when the color original image was input from the network, as a part of definition of the color document data.

2. The image processing apparatus according to claim 1, further comprising color matching means for performing color matching based on unique information indicative of characteristics of a predetermined output device and the unique information stored in said storage means, when the color document data is outputted from the output device.

3. The image processing apparatus according to claim 1, further comprising:

layout analysis means for discriminating character and noncharacter areas of the color original image and analyzing a layout of each area to obtain layout information for each area; and character recognition means for performing character recognition on the character area, wherein the layout information obtained by said layout analysis means and the character information obtained by said character recognition means are stored in said storage means as a part of the definition of the color document data.

4. The image processing apparatus according to claim 1, wherein the unique information is input/output color characteristic information of said input means or output means.

5. The image processing apparatus according to claim 1, further comprising access means for accessing a server, which includes a memory for storing color characteristic information of said input means, wherein the unique information is information indicative of the color characteristic information stored in the server.

6. The image processing apparatus according to claim 1, wherein, if there is no unique information of said input means with respect to the color original image to be outputted on a display device, unique information of the display device is stored in said storage means.

7. An image processing method, comprising the steps of:

inputting a color original image by an image scanner device or from a network;

converting the inputted original image into color document data with a predetermined structure;

determining whether the inputted original image was inputted by the image scanner device or from the network; and storing, when said determination step determines that the inputted original image was inputted by the image scanner device, unique information indicative of input characteristics of input means, used when reading the color original image, as a part of a definition of the color document data, wherein said storage step does not store the unique information indicative of input characteristics of the input means when the color original image was inputted from the network, as a part of the definition of the color document data.

8. A storage medium storing program code, for executing an image processing method, the program comprising:

code for inputting a color original image by an image scanner device or from a network;

code for converting the inputted original image into color document data with a predetermined structure;

code for determining whether the inputted original image was inputted by the image scanner device or from the network; and code for storing, when it is determined that the inputted original image was inputted by the image scanner device, unique information indicative of input characteristics of input means, used when reading the color original image, as a part of a definition of the color document data, wherein the unique information indicative of input characteristics of the input means is not stored when the color original image was inputted from the network, as a part of the definition of the color document data.

* * * * *

UNITED STATES PATENT AND TRADEMARK OFFICE
CERTIFICATE OF CORRECTION

PATENT NO. : 6,693,718 B1
DATED : February 17, 2004
INVENTOR(S) : Makoto Takaoka It is certified that error appears in the above-identified patent and that said Letters Patent is hereby corrected as shown below:

Column 1,
Line 13, "a" should read -- an --.

Column 2,
Line 33, "its" should read -- as its --.

Column 7,
Line 51, "ing's" should read -- ings --.

Column 8,
Line 9, "shifted,: and obtain" should read -- shifted to obtain --.

Column 9,
Line 35, "have" should read -- has --.
Line 42, "scanner" should read -- scanners --.

Column 10,
Line 5, "processing" should read -- processings --.

Signed and Sealed this

Sixth Day of July, 2004

JON W. DUDAS
*Acting Director of the United States Patent and Trademark Office*